United States Patent [19]

Lo

[11] Patent Number: 5,566,160
[45] Date of Patent: Oct. 15, 1996

[54] MEDIA ATTACHMENT UNIT MANAGEMENT INTERFACE

[75] Inventor: William Lo, Santa Clara, Calif.

[73] Assignee: Advanced Micro Devices, Inc., Sunnyvale, Calif.

[21] Appl. No.: 338,015

[22] Filed: Nov. 10, 1994

[51] Int. Cl.$^6$ ............................ H04L 12/24; H04L 12/26; H04L 12/40

[52] U.S. Cl. .................... 370/13.1; 370/97; 370/85.3; 370/85.4; 370/85.5

[58] Field of Search .................... 370/13, 13.1, 17, 370/85.1, 85.2, 85.3, 97, 85.4, 85.5; 375/211, 213

[56] References Cited

U.S. PATENT DOCUMENTS

| | | | |
|---|---|---|---|
| 5,287,343 | 2/1994 | Nakamura et al. | 370/13.1 |
| 5,339,307 | 8/1994 | Curtis | 370/13.1 |
| 5,384,767 | 1/1995 | Moorwood et al. | 370/13.1 |

Primary Examiner—Wellington Chin
Attorney, Agent, or Firm—Townsend and Townsend and Crew LLP

[57] ABSTRACT

Apparatus and method for simply, efficiently and economically accessing every media attachment unit (MAU) management information base (MIB) in a managed repeater. MAU MIBs pass through a repeater to a management unit that accesses the repeater for all of the MAU MIBs, in addition to the repeater MIB. Conversely, the management unit passes MAU control information to the MAUs through the repeater. Because all the MIBs in the managed repeater are accessed through the single device, a simple microprocessor interface is used to connect the repeater to the management unit. Also, the managed repeater signals, by generation of an interrupt for example, any changes in the MAU MIB to the management unit. In addition, the management unit easily determines which MAU caused a particular interrupt because all interrupt status signals are consolidated into registers in the repeater. The status signals are stored in a particular format to assist identification of status conditions for particular MAUs.

41 Claims, 5 Drawing Sheets

5,566,160

MEDIA ATTACHMENT UNIT MANAGEMENT INTERFACE

BACKGROUND OF THE INVENTION

The present invention relates generally to computer network management, and more particularly, it relates to an interface for managing media attachment unit (MAU) management information statistics.

FIG. 1 is a block diagram of a managed computer network 10. Network 10 includes a plurality of end stations 20 configured into a star topology having a plurality of managed repeaters 25 located at hubs of the star topology configuration.

Each end station 20 includes a data terminal equipment (DTE) 30 coupled to a media attachment unit (MAU) 35 by an attachment unit interface (AUI). MAU 35 converts signals from a format appropriate for the AUI and a format particular to a media type connecting an end station 20 to a particular managed repeater 25. This media includes twisted pair, coaxial, and fiber optic, for example.

Managed repeater 25 includes a repeater 40 having a plurality of ports, each coupled to a repeater MAU 45. Repeater 40 is coupled to each repeater MAU 45 by an AUI. Managed repeater 25 also includes a management unit (MU) 50. MU 50 includes a microprocessor 55, a media access control (MAC) 60, and a random access memory (RAM) 65.

Computer network 10 implements a network architecture that conforms to IEEE Standard 802.3, hereby expressly incorporated by reference for all purposes. Repeater function is defined in the incorporated IEEE 802.3 standard and will not be further described herein.

IEEE standard 802.3 defines a number of management information base (MIB) or statistics for both repeater 40, and for each repeater MAU 45. Every data packet transmitted from one end station 20 to another end station 20 must pass through every repeater 40. MU 50 is thus able to gather the necessary statistics of the data packets transmitted in computer network 10 by accessing data from repeater 40, and each repeater MAUs 45. The 802.3 standard defines many different repeater statistics, but only a few repeater MAU statistics. As shown in FIG. 1, MU 50 must include an interface for repeater 40, as well as an interface for each repeater MAU 45.

Implementing managed repeater 25 as shown in FIG. 1 is expensive, especially when one considers the interface circuitry required for each repeater MAU and the relatively few statistics obtained from implementation of these various interfaces. Additionally, there are costs associated with implementing managed repeater 25 to coordinate an acquisition of statistics from the several devices. It is desirable to reduce costs associated with production and implementation of managed repeater 25.

SUMMARY OF THE INVENTION

The present invention provides apparatus and method for simply, efficiently and economically accessing every media attachment unit (MAU) management information base (MIB) in a managed repeater. By passing the MAU MIB through the repeater, a management unit accesses the repeater to obtain all of the MAU MIBs, in addition to the repeater MIB. Conversely, in the preferred embodiment, the management unit passes MAU control information to the repeater MAUs through the repeater. Since all the MIBs in the managed repeater are accessed through the single device, a simple microprocessor interface is used to connect the repeater to the management unit. Also, the preferred embodiment signals, by generation of an interrupt for example, any changes in the MAU MIB to the management unit. The management unit easily determines which MAU caused a particular interrupt because all interrupt status signals are consolidated into registers in the repeater. The status signals are stored in a particular format to assist identification of status conditions for particular MAUs.

According to one aspect of the invention, it includes a managed repeater for obtaining a status condition from a media attachment unit (MAU). The managed repeater includes a MAU interface, coupled to the MAU, for responding to a MAU status signal to output the status condition. The managed repeater also includes a repeater, coupled to the MAU interface, for asserting the MAU status signal, the repeater receiving the status condition from said MAU interface via a status data line.

In another embodiment, a MAU multiplexer provides MAU status signals to the repeater, or a combination of MAU interfaces and MAU multiplexers is used. The present invention detects whether a MAU interface (allowing two way communication between the MAUs and the repeater) or a MAU multiplexer (one-way communication) is connected to ports of the repeater. The managed repeater detects changes and dynamically adapts to different configurations.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 1:
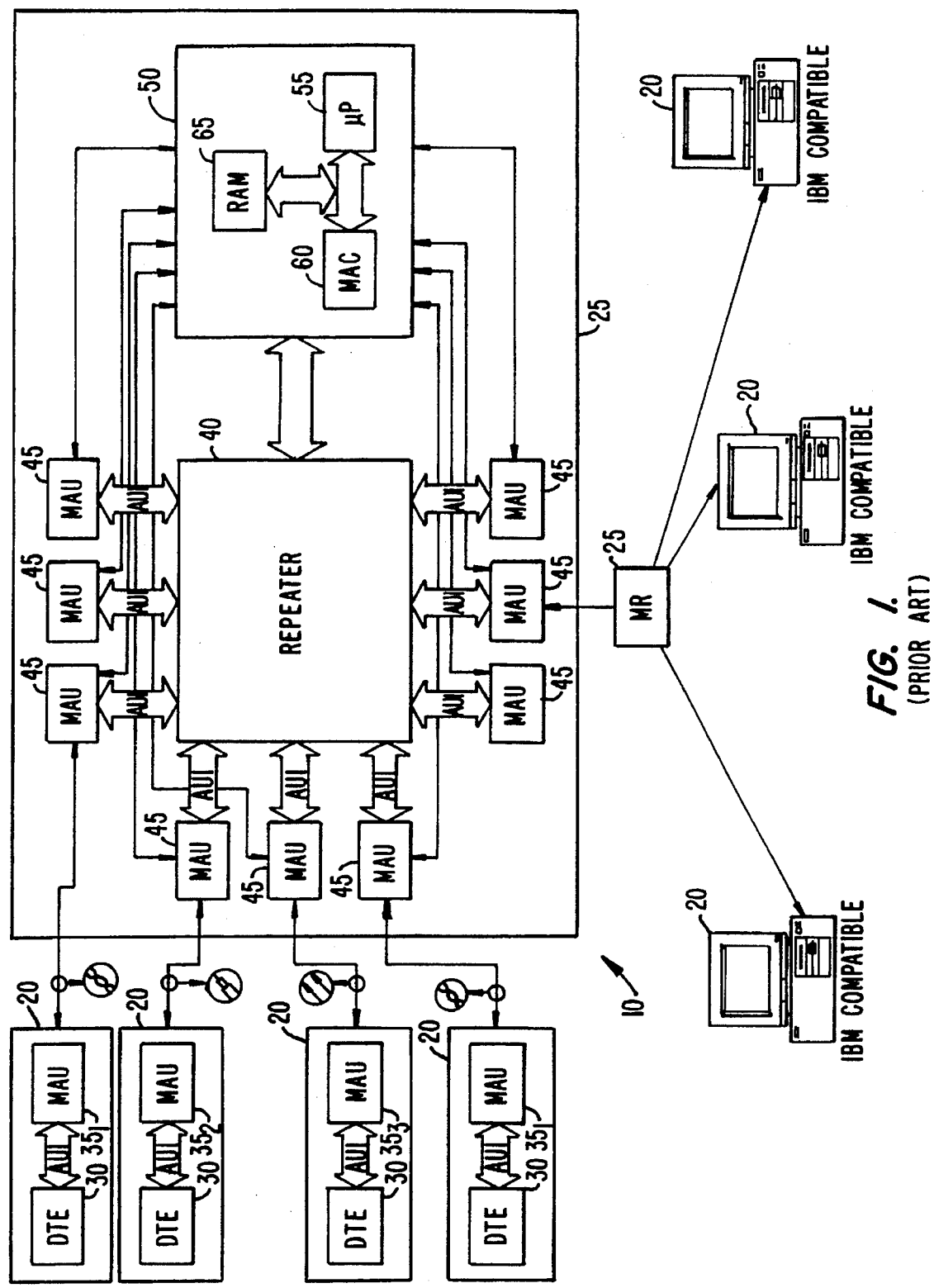
FIG. 1 is a block diagram of a prior art managed repeater.
Figure 2:
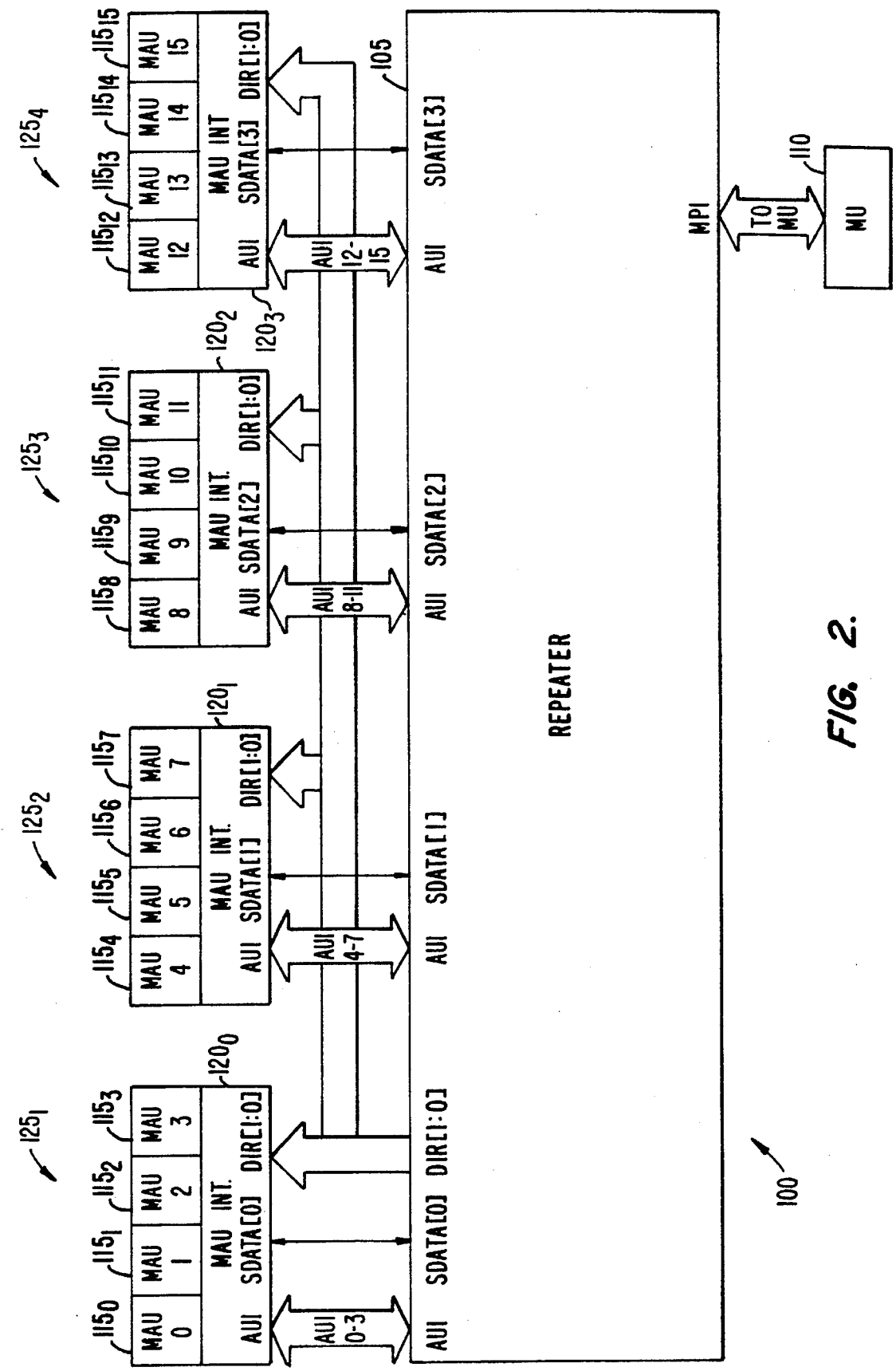
FIG. 2 is a schematic block diagram of a repeater including a preferred embodiment of the present invention.

FIG. 2 is a schematic block diagram of a managed repeater 100 including a repeater 105 and a management unit 110, with managed repeater 100 implementing a preferred embodiment of the present invention. Managed repeater 100 includes sixteen repeater MAUs ($115_i$) and four MAU interfaces $120_j$, each MAU interface 120 is coupled to four repeater MAUs 115, i=0–15 and j=0–3. The implementation provides for four 4-port transceiver integrated circuits $125_k$, k=1–4. Each integrated circuit 125 includes four repeater MAUs 115 and one MAU interface 120 integrated on a single monolithic substrate.

Each MAU interface 120 provides AUI signals from each repeater MAU 115 to repeater 105 as well known. Each repeater MAU 115 also has one or more status conditions used by management unit 50 for the MAU MIBs. MAU interface 120 combines the various status conditions from those repeater MAUs 115 integrated with it, and passes those status conditions to repeater 105 via a status data line (SDATA). There are a total of four SDATA[X] lines, one for each MAU interface 120.

In the preferred embodiment, repeater 105 issues control signals to each repeater MAU 115 by using the SDATA line. Repeater 105 asserts a 2-bit direction signal (DIR[1:0] sometimes referred to as a MAU status signal) to each MAU interface 120 to control a direction of data transfer on SDATA. The various status condition signals and control signals, in the preferred embodiment, are time-division multiplexed as will be explained in greater detail below.

Repeater 105 provides a microprocessor interface (MPI) that allows management unit 110 to gather statistics for repeater 105, and every repeater MAU 115. Management unit 110 is thus able to gather all the statistics for the repeater MIB and for the MAU MIB from a single device, namely repeater 105.

In operation, repeater 105 asserts the direction signal to each MAU interface 120 indicating that repeater 105 will receive the various status conditions. Each MAU interface 120 samples the various status conditions for each repeater MAU 115 it is coupled to (as further explained in detail below), and outputs the various status condition signals in multiplexed form to repeater 105 on the SDATA line. Repeater 105 either stores the various data conditions, allowing management unit 110 to access the statistics when needed, or repeater 105 passes the statistics to management unit 110 as they are received. This detail is a design consideration, and may be implemented in many different ways. One aspect of the preferred embodiment that is important is that all the statistics are gathered together and accessible by a management unit from a single device. In the preferred embodiment, since the repeater MIB requires the most data, it was desired to consolidate the other statistics into repeater 105. In some implementations, all statistics may be consolidated into a single device other than repeater 105 while still embodying the present invention.

Figure 3:
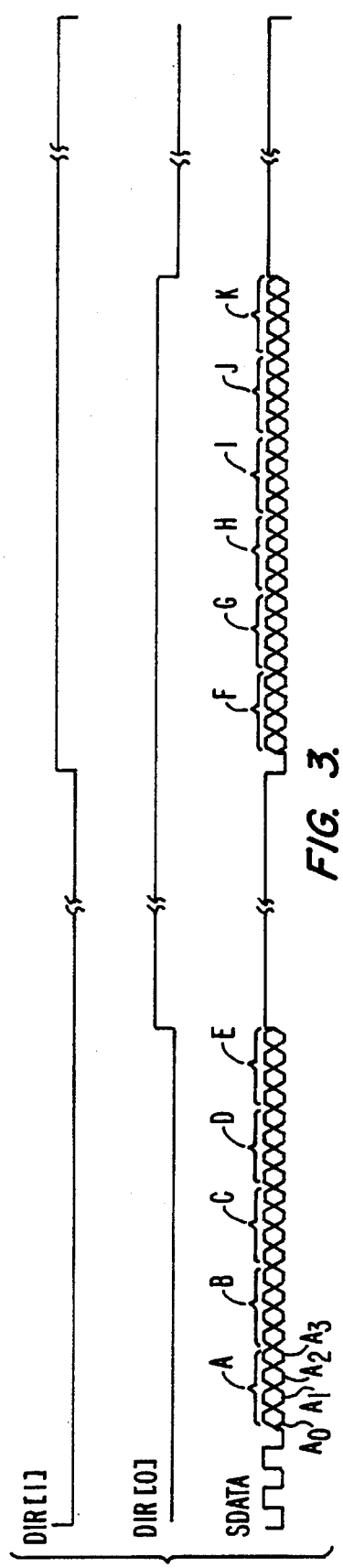
FIG. 3 is a timing diagram for control signals of a repeater of the preferred embodiment.

FIG. 3 is a timing diagram for direction signals and SDATA[X] of managed repeater 100 shown in FIG. 2 As described earlier, SDATA[X] is a serial data stream passed between repeater 105 and one particular MAU interface $120_x$. DIR[1:0] are direction bits asserted by repeater 105 to control a direction of the SDATA signals. As shown, DIR[1] controls the SDATA direction: when DIR[1] is HIGH, repeater 105 drives SDATA, and when DIR[1] is LOW, MAU interface 120 drives SDATA. DIR[0] is used with DIR[1] for an alternate embodiment (described below) using a generic repeater MAU (i.e., a MAU not coupled to a MAU interface or compatible device).

DIR[1:0] cycles through four states: 10 to 00 to 01 to 11, and thereafter back to 10 to repeat the cycle. Each period of DIR[1:0] is a DIR cycle. For each DIR cycle, each MAU interface $120_x$ passes five different status conditions (labelled A–E) for each port on SDATA[X] to repeater 105, and repeater 105 passes six different control bits (labelled F–K) for each port on SDATA[X] to MAU interface $120_x$. In FIG. 3, there are four bit positions for each status condition period. These correspond to the particular one repeater MAU 115 of the four repeater MAUs 115 coupled to each MAU interface 120.

A beginning of data transfer occurs when repeater 105 transitions DIR[1:0] into the 00 state. As noted above, the 00 state results in each MAU interface $120_x$ (in transceiver $125_x$) driving SDATA[X]. A MAU interface $120_x$ embodying the present invention signals to repeater 105 that it is able to participate in the protocol described above by initially driving SDATA[X] with a 01010 code. Each MAU interface $120_x$ begins each transmission to repeater 105 with this code.

MAU interface $120_x$ then drives SDATA[X] with bits representing status conditions for status A. In the preferred embodiment, MAU interface $120_x$ drives SDATA[X] with status A for repeater MAU $115_{0+x}$, then with status A for repeater MAU $115_{1+x}$, then with status A for repeater MAU $115_{2+x}$, and then with status A for repeater MAU $115_{3+x}$. Thereafter, MAU interface $120_x$ continues the process for status B, then C, then D, and finally E.

After receiving all of the status condition bits from MAU interface $120_x$, repeater 105 transitions DIR[1:0] into the 01 state. During the 01 state, neither repeater 105 or MAU interface $120_x$ drives SDATA[X]. Rather, repeater 105 passively pulls SDATA[X] high.

Some time after transitioning DIR[1:0] into the 01 state, repeater 105 transitions DIR[1:0] into the 11 state. For the 11 state, repeater 105 drives each SDATA[X] with control bits associated with various control functions. However, repeater 105 only drives those SDATA[X] lines coupled to MAU interface $120_x$ (i.e., those that issued the 01010 code signal). This check is made each DIR cycle, and can change, allowing dynamic configuration of a network. Similarly to MAU interface $120_x$, repeater 105 drives SDATA[X] with control bits for control signals F–K.

After sending six control signals to each repeater MAU 115, repeater 105 transitions DIR[1:0] to the 10 state. Just as in the 01 state, neither repeater 105 nor MAU interface $120_x$ drives SDATA[X]. Rather, repeater 105 once again pulls SDATA[X] high. Some time after transitioning DIR[1:0] into the 10 state, repeater 105 transitions DIR[1:0] into the 00 state, thereby completing the DIR cycle.

Figure 4:
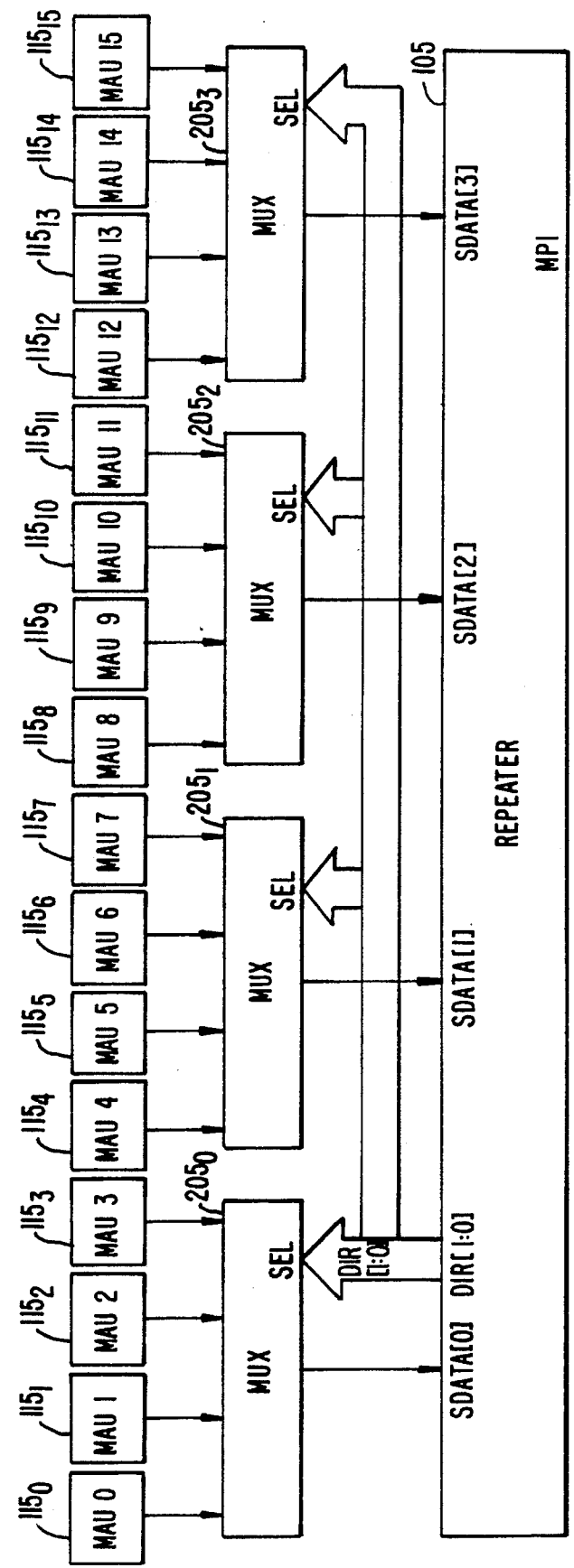
FIG. 4 is a schematic block diagram of an alternate preferred embodiment of the present invention.

FIG. 4 is a schematic block diagram of an alternate preferred embodiment for a managed repeater 200. Managed repeater 200 includes repeater 105 and sixteen repeater MAUs $115_i$ as shown in FIG. 2, and that operate as described above with respect to FIG. 2 and FIG. 3. To simplify FIG. 4, the AUI bus from each repeater MAU 115 to repeater 105 is not shown.

The preferred embodiment of managed repeater 200 also includes four MAU multiplexers $205_1$, 1=0–3, one MAU multiplexer 205 coupled to four repeater MAUs 115. Each MAU multiplexer 205 includes four input ports, an output port and a select port (SEL). MAU multiplexer 205 responds to a value asserted at SEL to selectively route one of the inputs to the output. To further simplify FIG. 4, it is assumed that only a single status condition from each repeater MAU 115 is desired. Therefore for each group of four repeater MAUs 115, each of the status condition outputs is coupled to one of the inputs of a MAU multiplexer 205. Thus, each of the sixteen repeater MAUs 115 is coupled to one of the four MAU multiplexers 205.

The output of each MAU multiplexer $205_x$ is coupled to the SDATA[X] line of repeater 105. The DIR[1:0] output from repeater 105 is coupled to the SEL input of each MAU multiplexer 205.

In operation, repeater 105 transitions DIR[1:0] as shown in FIG. 3. Thus, when DIR[1:0] transitions to the 00 state, each MAU multiplexer $205_x$ will drive SDATA[X] with the status condition of repeater MAU 115 coupled to the first input. Similarly, as DIR[1:0] transitions to the 01 state, then to state 11, and then to the 10 state, each MAU multiplexer $205_x$ drives SDATA[X] with the status condition of repeater MAU 115 coupled to the second, the fourth, and then the third input, respectively. Note that the status signal for the third and fourth position are out of order. After receiving the status indications, repeater 105 reorders the status values and either stores them for later access through the MPI, or sends the status condition information to management unit 50 through the MPI.

Repeater 105 in this alternate preferred embodiment never drives SDATA[X], and always is in a receive mode. This is because a MAU multiplexer 205 does not issue the 01010 code when DIR[1:0] transitions to the 00 state. Repeater 105, upon failing to receive the code signal on a particular SDATA[X] line, assumes that the device coupled to the SDATA[X] line is a MAU multiplexer rather than a MAU interface. For each DIR cycle, repeater 105 monitors each SDATA[X] line to determine the type of device the status line is connected to. When the device is a MAU interface, repeater operates as described above with respect to FIG. 2. When the device does not identify itself as a MAU interface, or a compatible device by issuing the 01010 code, repeater 105 assumes that the device is a MAU multiplexer, or compatible device.

In another preferred embodiment, it is possible to have both MAU interfaces and MAU multiplexers coupled to repeater 105 at the same time, though connected to different SDATA[X] lines. Repeater 105 individually categorizes devices on each SDATA[X] line. Therefore, an embodiment of the present invention could include two MAU interfaces 120 coupled to SDATA[0] and SDATA[1], and two MAU multiplexers 205 coupled to SDATA[2] and SDATA[3]. In operation, this preferred embodiment would operate like the embodiment described above with reference to FIG. 2 for the SDATA lines coupled to MAU interfaces 120 while operating like the embodiment described above with respect to FIG. 4 for the SDATA lines coupled to MAU multiplexers 205.

Figure 5:
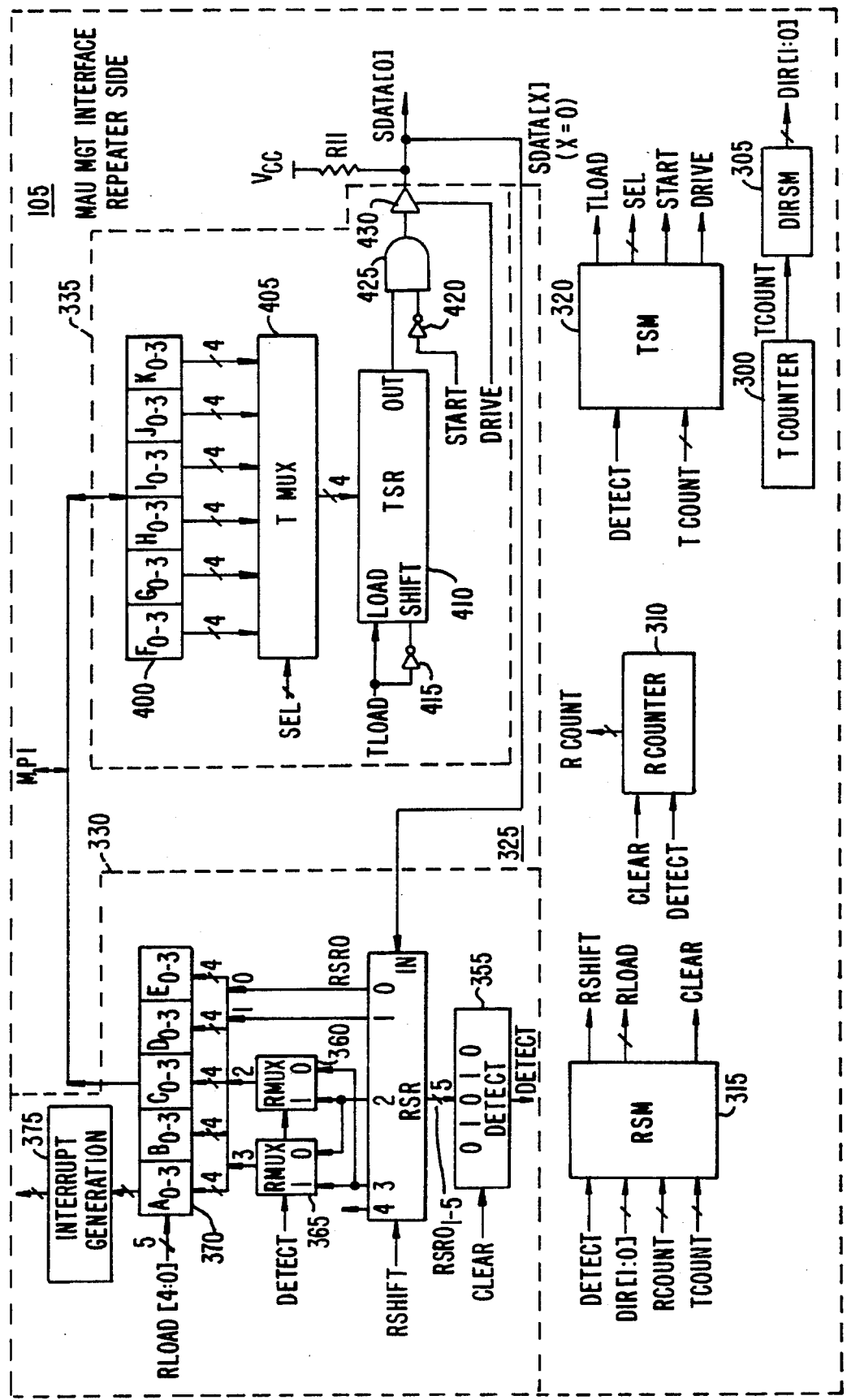
FIG. 5 is a detailed block diagram of a repeater interface for implementing the preferred embodiment.

FIG. 5 is a detailed block diagram of a portion of repeater 105 for implementing the preferred embodiment of the present invention. The diagram shown in FIG. 5 depicts components used for a single SDATA[X] line. For the embodiment shown in FIG. 2, the components shown in FIG. 5 (except for TCOUNTER and DIRSM) are replicated four times to interface to a total of four SDATA lines. Repeater 105 includes a transmission counter (TCOUNTER) 300 coupled to a direction signal state machine (DIRSM) 305. TCOUNTER 300 is a freerunning counter that counts from zero to twenty-four. TCOUNTER 300 outputs its count (TCOUNT) to an input of DIRSM 305. DIRSM 305 maintains the states for DIR[1:0], providing DIR[1:0] as its output. Each time TCOUNT is 0, DIRSM 305 changes its state, and its output, to another state. DIRSM 305 state transition order is 00, 01, 11, and 10. DIRSM 305 continuously cycles through these states in this order in response to TCOUNT.

Repeater 105 also includes a receive counter (RCOUNTER) 310, a receive state machine (RSM) 315, a transmit state machine (TSM) 320, and an SDATA circuit 325. RCOUNTER 310 is responsive to a DETECT signal to count from zero to twenty. The output of RCOUNTER 310 is RCOUNT. Assertion of CLEAR resets RCOUNTER 310. RSM 315 is responsive to DETECT, DIR[1:0], RCOUNT and TCOUNT to generate RSHIFT, RLOAD, and CLEAR. TSM 320 is responsive to DETECT and TCOUNT to generate SDATA transmission control signals. These signals include: TLOAD, SEL, START and DRIVE.

SDATA circuit 325 includes a receiver 330 and a transmitter 335 coupled to the SDATA[X] line. Also coupled to the SDATA[X] line is resistor R1. Resistor R1, being also coupled to $V_{CC}$, passively pulls the SDATA[X] line high unless it is driven by a transmitter.

Receiver 330 includes a five-bit receive shift register (RSR) 350 (right shift), a 01010 code detector 355, two receiver multiplexers (RMUX) (360 and 365), and a receive status memory 370. RSR 350 has an input, and a five-bit output $RSRO_k$, (k=1 to 5). The input of RSR 350 is coupled to SDATA[X] to receive the SDATA[X] signal stream from a MAU interface or a MAU multiplexer. The $RSRO_{1-5}$ are coupled to an input of code detector 355, and $RSRO_{1-4}$ are coupled to receive status memory 370. RSR 350 is responsive to the RSHIFT signal provided from RSM 315. When RSM 315 asserts RSHIFT, RSR 350 shifts a data bit from SDATA[X] into its memory. RSM 315 asserts RSHIFT depending upon the status of input signals DETECT, DIR [1:0], RCOUNT, and TCOUNT.

Code detector 355 receives $RSRO_{1-5}$ from RSR 350 and asserts DETECT if a match is found. Once asserted, code detector 355 continues to assert DETECT until CLEAR is asserted. DETECT is an input into RSM 315, RMUX 360, RMUX 365, RCOUNTER 310, and TSM 320. When DETECT is asserted, a MAU interface, or compatible, device drives SDATA[X] as described above. Thus, receiver 330 is configured and operated to demultiplex the various status conditions multiplexed on SDATA[X]. When DETECT is not asserted, receiver 350 is configured to receive data from a MAU multiplexer, or compatible device. This is important because receiver 330 receives five status indications from each repeater MAU when SDATA[X] is coupled to a MAU interface. However, receiver 330 only receives one status indications from each repeater MAU when connected to a MAU multiplexer.

RMUX 360 and RMUX 365 are coupled to $RSRO_3$ and $RSRO_4$ with the $RSRO_3$ coupled to a first input of RMUX 365 and to a second input of RMUX 360. Similarly, the $RSRO_4$ output is coupled to a first input of RMUX 360 and to a second input of RMUX 365. The DETECT signal operates as the multiplexer select signal for these muliplexers. The function of these multiplexers is to change a bit order of the bits of $RSRO_3$ and $RSRO_4$ when DETECT is deasserted. The reason for changing the order is due to a state transition order for DIR[1:0]. As described above, DIR[1:0] transitions from the 00 state, to the 10 state, to the 11 state and then to the 01 state. The bit values for $RSRO_3$ and $RSRO_4$ need to be exchanged when receiver 330 receives status signals from a MAU multiplexer. (In other words, for a byte $A_2A_3A_1A_0$ stored in RSR 350, RMUX 360 and RMUX 365 rearranges the bits to be $A_3A_2A_1A_0$ Receive status memory 370 includes five four-bit registers, once for each status condition A–E. Each register does a parallel load of four bits. Each register has a bit position for each repeater MAU. These four bits include $RSRO_1$ and $RSRO_2$, as well as the outputs of RMUX 360 and RMUX 365. These same four bits are provided to each register of receive status memory 370. The particular register that loads the data is dependent upon a value of the RLOAD signal asserted from RSM 315. RLOAD identifies the particular register to load the data from RSR 350. Receiver 330 includes an interrupt generator 375 that detects when data is written into receive status memory 370, and identifies the register having status data. The interrupt signal is provided to a microprocessor coupled to the MPI. The microprocessor accesses the status conditions by reading the status conditions from receive status memory 370.

Transmitter 335 includes a control signal memory 400, a transmit multiplexer (TMUX) 405, a transmit shift register (TSR) 410, two inverters (415 and 420), a dual-input AND gate 425 and a tri-state buffer 425. Control signal memory 400 has an input coupled to the MPI and includes six four-bit registers. Each bit position of a register corresponds to one port of repeater 105. As described above, repeater 105 drives SDATA[X] with six control bits (F–K) for each repeater MAU coupled to a MAU interface. The registers of control signal memory 400 store bit values corresponding to these control signals. Each register has a four-bit wide output to access the stored control bits.

A twenty-four bit wide input of TMUX 405 is coupled to the six four-bit wide outputs of control signal memory 400. In response to the SEL signal, TMUX 405 routes four of the control signals from one register to a four bit wide output. A four-bit wide input of TSR 410 is coupled to the output of TMUX 405. TSR 410 includes a load input, a shift input and a serial output port. TLOAD is coupled to the load input and to an input of inverter 415. An output of inverter 415 is coupled to the shift input. The output port of TSR 410 is coupled to a first input of AND gate 425. The START signal from TSM 320 is coupled to an input of inverter 420. An output of inverter 420 is coupled to a second input of AND gate 425. An output of AND gate 425 is coupled to an input of tri-state buffer 430. The DRIVE signal from TSM 320 is coupled to a control port of tri-state buffer 430. An output of tri-state buffer 430 is coupled to the SDATA[X] line. Assertion of DRIVE enables tri-state buffer to drive SDATA[X] with control information from TSR 410.

In operation, when DIR[1:0] transitions from the 10 state to the 00 state, RSM 315 asserts RSHIFT to RSR 350 and asserts CLEAR to both code detector 355 and to RCOUNTER 310. The first five bits on SDATA[X] after the transition to the 00 state are loaded into RSR 350. If code detector 355 detects the 01010 code, it continues to assert DETECT until DIR[1:0] next transitions from the 10 state to the 00 state. If DETECT is not asserted prior to TCOUNT reaching ten, code detector 355 will not assert DETECT until the next transition of DIR[1:0] from the 10 state to the 00 state. To satisfy this condition, RSM 315 asserts and maintains CLEAR to code detector 355 if DETECT is not asserted prior to TCOUNT equalling ten.

When DETECT is asserted, RCOUNTER 310 begins counting, and then resets to zero, RSHIFT remains asserted for a remainder of a cycle (allowing data on SDATA to shift into RSR 350). When RCOUNT reaches four, RLOAD loads the value from RSR 350 into register A of receive status memory 370. Similarly, when RCOUNT reaches eight, twelve, sixteen, and twenty, RLOAD respectively loads data from RSR 350 into register B, C, D and E. The values in receive status memory 370 will either cause interrupt generator 375 to assert an interrupt signal, or remain in memory until accessed through the MPI.

For transmissions (after an assertion of DETECT), when DIR[1:0] transitions from the 01 state to the 11 state (TCOUNT equals zero), TSM 320 asserts DRIVE as long as DIR[1:0] is in the 11 state. TSM 320 asserts START for one cycle to generate a start bit for SDATA[X]. TSM 320 asserts TLOAD for TCOUNT values of 0, 4, 8, 12, 16, and 20 to respectively load the F–K register values from control signal memory 400. TSM 320 asserts appropriate selection signals (SEL) to TMUX 405 to route the values from the appropriate register to TSR 410. Inverter 415, coupling TLOAD to the shift input of TSR 410, causes TSR 410 to shift control bits of the stored register values out to tri-state driver 430. Tri-state driver 430 drives SDATA[X] with each control bit of each of the F–K registers.

When code detector 355 does not assert DETECT, the sequencing is different. RSM 315 asserts RSHIFT to RSR 350 for one cycle every time TCOUNT equals eleven. RSR thus samples SDATA[X] once for every state transition of DIR[1:0]. When DIR[1:0] is in the 10 state, and TCOUNT equals twelve, RSM 315 asserts RLOAD to store the value in RSR 350 into register A of receive status memory 370. As mentioned above, since DIR[1:0] state transitions occur in order: 00, 01, 11, and 10 rather than 00, 01, 10, and 11, RMUX 360 and RMUX 365 corrects the order. On the transmit side, TSM 320 does not assert DRIVE unless DETECT is asserted. Without DRIVE asserted, tri-state buffer 430 will not output any data on SDATA[X].

Figure 6:
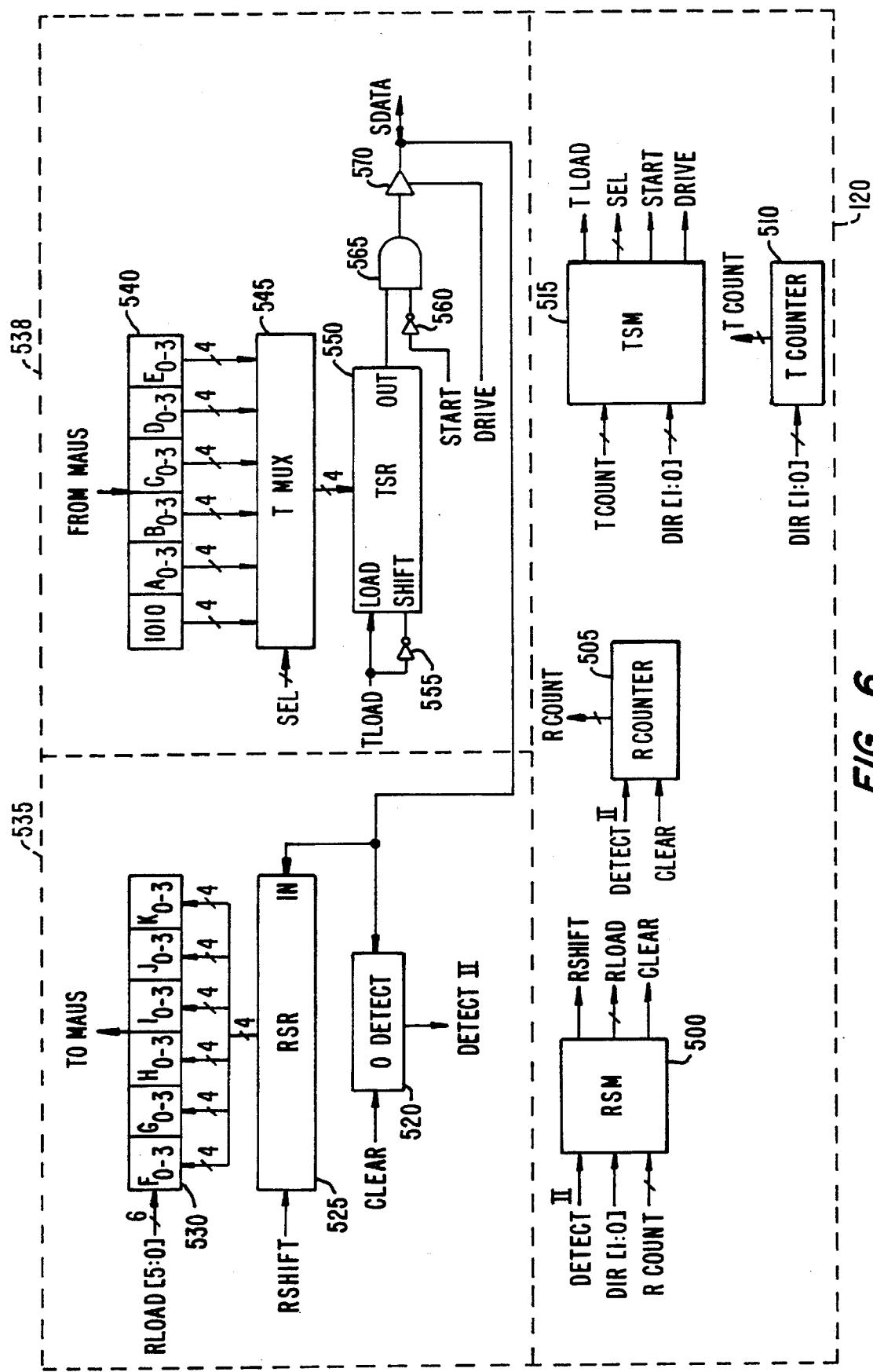
FIG. 6 is a detailed block diagram of a MAU interface for implementing the preferred embodiment of the present invention.

FIG. 6 is a detailed block diagram of MAU interface $120_x$ for implementing the preferred embodiment of the present invention. MAU interface $120_x$ includes a receive state machine (RSM) 500, a receive counter (RCOUNTER) 505, a transmit counter (TCOUNT) 510, a transmit state machine (TSM) 515, a receiver 535, and a transmitter 538. RCOUNTER 505 is responsive to a DETECT_II signal to generate RCOUNT having a value from zero to twenty-four. RSM 500 is responsive to the DETECT_II signal, the DIR[1:0] state and RCOUNT to generate RSHIFT, RLOAD and CLEAR. TCOUNTER 510 is responsive to the DIR[1:0] state to generate TCOUNT. TSM 515 is responsive to TCOUNT and to the DIR[1:0] state to generate TLOAD, SEL, START and DRIVE.

Receiver 535 includes a 0 code detector 520, a right shift register (RSR) 525 and a MAU control memory 530. An input of code detector 520 and an input of RSR 525 are coupled to the SDATA[X] input line for receipt of control signals from repeater 105. Code detector 520 asserts DETECT_II upon detecting the START bit transmitted from repeater 105 (when DIR[1:0] transitions to the 11 state). RSR 525 is a four-bit right shift register. In response to an assertion of RSHIFT, RSR 525 shifts in control bits received from repeater 105 via the SDATA[X] line. RSR outputs four bits at a time, corresponding to each repeater MAU and control signal type. Control memory 530 includes six four-bit wide registers (one register for each control signal F–K, and one bit in each register for each repeater MAU). Control memory 530 is responsive to the RLOAD signal from RSM 500 to load the output of RSR 525 into the appropriate register. An output of control memory 530 is coupled to control inputs of the repeater MAUs.

Transmitter 538 includes MAU transmit memory 540, a transmit multiplexer (TMUX) 545, a transmit shift register (TSR) 550, an inverter 555, an inverter 560, a dual-input AND gate 565 and a tri-state driver 570. The components of transmitter 538 are configured similarly to corresponding components of transmitter 335 shown in FIG. 5. Differences between the transmitters shown in FIG. 5 and FIG. 6 relate to memory 540. Memory 540 is coupled to the repeater MAUs. Five of the six registers of memory 540 store status codes corresponding to the five status conditions A–E. One bit per register corresponds to a particular MAU. The sixth register of memory 540 is hardwired with a 1010 pattern. When combined with the 0 start bit, the value of the sixth register produces the 01010 code so transmitter 538 informs repeater 105 that it is part of a MAU interface.

In operation, MAU interface 120 operates similarly to the interface described above with respect to FIG. 5, except as noted. For transmitter 538, when DIR[1:0] transitions to the 00 state, TCOUNTER 510 counts from zero to twenty-four and transmission begins. The first transmission is the START bit and the 1010 header from memory 540. Thereafter, the A–E status conditions for the various repeater MAUs are driven on SDATA[X] by tri-state buffer 570. Transmission does not depend upon DETECT_II. DIR[1:0] are inputs into MAU interface 120 provided by repeater 105.

Receiver 535 does not test for the 01010 code signal. The test for the START bit (0) is sufficient. Code detector 520 asserts DETECT_II upon the first zero bit detected after CLEAR is asserted by RSM 500. DETECT_II remains asserted thereafter until CLEAR is asserted. RSM 500 asserts CLEAR when DIR[1:0] transitions to the 11 state. MAU interface 120 operates in only a single receive mode, therefore there is no requirement for receive multiplexers as described above with respect to FIG. 5.

In conclusion, the present invention provides a simple, efficient solution to a problem of access to all MIBs, repeater and MAU, from a single device. Additionally, issuing commands to one device allows distribution of those commands, or control signals, to the repeater and to the several MAUs. Different configurations and combinations of MAU interfaces and MAU multiplexers are possible. These configurations are dynamically updated. A management unit can receive indications (such as an interrupt) when the configuration changes, or when status conditions change. While the above is a complete description of the preferred embodiments of the invention, various alternatives, modifications, and equivalents may be used. Therefore, the above description should not be taken as limiting the scope of the invention which is defined by the appended claims.

What is claimed is:

1. An apparatus for obtaining a status condition from a media attachment unit (MAU) incorporated into a package, comprising:

a MAU interface, coupled to the MAU, for responding to a MAU status signal to output the status condition; and a repeater, distinct from the package and coupled to said MAU interface, for asserting said MAU status signal, said repeater receiving the status condition from said MAU interface via a status data line.

2. The apparatus of claim 1 wherein said MAU status signal has two values and said MAU interface responds to said first state to output the status condition; and wherein said repeater asserts said second state of said MAU status signal to said MAU interface and said MAU interface receives a control signal for the MAU from said repeater on said status line when said second state is asserted.

3. The apparatus of claim 1 wherein the MAU is integrated on a monolithic substrate in the package and said MAU interface is integrated on said substrate.

4. The apparatus of claim 1 further comprising:

a management unit, coupled to said repeater, for receiving the status condition from said repeater.

5. An apparatus, comprising:

a first and a second media attachment unit (MAU), each said MAU having a status condition;

a MAU interface, coupled to said first MAU and to said second MAU, for responding to a MAU status signal to output said status conditions; and a repeater, coupled to said MAU interface, for asserting said MAU status signal, said repeater receiving said status conditions from said MAU interface via a status data line.

6. The apparatus of claim 5 further comprising:

a management unit, coupled to said repeater, for receiving said status conditions from said repeater.

7. The apparatus of claim 5 wherein said MAU status signal has two values and said MAU interface responds to said first state to output said status conditions; and wherein said repeater asserts said second state of said MAU status signal to said MAU interface and said MAU interface receives a first control signal for said first MAU and a second control signal for said second MAU from said repeater on said status line when said second state is asserted.

8. The apparatus of claim 5 further comprising:

a third and a fourth MAU, said third MAU having a third status condition and said fourth MAU having a fourth status condition;

a second MAU interface, coupled to said third MAU and to said fourth MAU, for responding to said MAU status signal to output said third and said fourth status conditions; and wherein said repeater is coupled to said second MAU interface and said repeater receives said third and said fourth status conditions from said second MAU interface via a second status data line.

9. The apparatus of claim 8 wherein said management unit receives said third and said fourth status conditions from said repeater.

10. The apparatus of claim 8 wherein said MAU status signal has two values and said MAU interfaces respond to said first state to output said status conditions; and wherein said repeater asserts said second state of said MAU status signal to said MAU interfaces and said first MAU interface receives a first control signal for said first MAU and a second control signal for said second MAU from said repeater on said first status line and said second MAU interface receives a third control signal for said third MAU and a fourth control signal for said fourth MAU from said repeater on said second status line when said second state is asserted.

11. An apparatus, comprising:

a first and a second media attachment unit (MAU), each said MAU having a status condition;

a MAU multiplexer, coupled to said first MAU and to said second MAU, for responding to a MAU status signal to output said status condition of said first MAU when said MAU status signal has a first value and for outputting said status condition of said second MAU when said MAU status signal has a second value; and a repeater, coupled to said MAU multiplexer, for asserting said first value and said second value of said MAU status signal to said MAU multiplexer, said repeater receiving said status conditions from said MAU multiplexer via a status data line in response to said MAU status signal.

12. The apparatus of claim 11 further comprising:

a management unit, coupled to said repeater, for receiving said status condition from said repeater.

13. The apparatus of claim 11 further comprising:

a third and a fourth MAU, each having a status condition;

a second MAU multiplexer, coupled to said third MAU and to said fourth MAU, for responding to said MAU status signal to output said status condition of said third MAU when said MAU status signal has said first value and for outputting said status condition of said fourth MAU when said MAU status signal has said second value; and wherein said repeater, coupled to said second MAU multiplexer, receives said status conditions from said second MAU multiplexer via a second status data line.

14. The apparatus of claim 13 further comprising:
a management unit, coupled to said repeater, for receiving said status conditions from said repeater.

15. An apparatus, comprising:
a first and a second media attachment unit (MAU), each said MAU having a status condition;
a MAU multiplexer, coupled to said first MAU and to said second MAU, for responding to a MAU status signal to output said status condition of said first MAU when said MAU status signal has a first value and for outputting said status condition of said second MAU when said MAU status signal has a second value; and
a third and a fourth MAU, each having a status condition;
a MAU interface, coupled to said third MAU and to said fourth MAU, for responding to said first value of said MAU status signal to output :said status conditions of said third MAU and said fourth MAU; and
a repeater, coupled to said MAU multiplexer and to said MAU interface, for asserting said first value and said second value of said MAU status signal to said MAU multiplexer, said repeater receiving said status conditions from said MAU multiplexer via a status data line in response to said values MAU status signal, and wherein said repeater receives said status conditions from said MAU interface via a second status data line when said MAU status signal has said first value.

16. The apparatus of claim 15 further comprising:
a management unit, coupled to said repeater, for receiving said status conditions from said repeater.

17. The apparatus of claim 15,
wherein said repeater asserts said second state of said MAU status signal to said MAU interface and said MAU interface receives a first control signal for said third MAU and a second control signal for said fourth MAU from said repeater on said second status line.

18. A method for managing a media attachment unit (MAU) having a status condition, wherein the MAU is coupled to a repeater, the method comprising the step of:
accessing, by the repeater, the status condition from the MAU by asserting a MAU status signal from the repeater to a MAU interface coupled to the MAU.

19. The MAU managing method of claim 18 further comprising the step of:
accessing the MAU status condition from the repeater by a management unit coupled to the repeater.

20. A method for accessing a first status condition from a first media attachment unit (MAU) and a second status condition from a second MAU, comprising the steps of:
asserting a MAU status signal to a first MAU interface coupled to the first MAU and to a second MAU interface coupled to the second MAU;
receiving the first status condition from said first MAU interface by a repeater coupled to said first MAU interface via a first status data line;
receiving the second status condition from said second MAU interface by said repeater coupled to said second MAU interface via a second status data line; and
passing said status conditions from said repeater to a management unit.

21. A MAU interface for communicating status information from a MAU to a repeater, comprising:
means, coupled to the MAU, for receiving a repeater-neutral status condition; and
means, coupled to the repeater and to the means for receiving, for transmitting said repeater-neutral status condition to the repeater via a status data line in response to a MAU status signal received from the repeater.

22. The MAU interface as claimed in claim 21 further comprising:
means, coupled to the repeater, for receiving a MAU command signal from the repeater via said status data line in response to a MAU command signal received from the repeater; and
means, coupled to the MAU, for transmitting said MAU command signal to the MAU.

23. The MAU interface as claimed in claim 22 further comprising:
means, coupled to said repeater-neutral status condition transmitting means, for transmitting an identification signal to said repeater to indicate a bidirectional capability of said status data line.

24. A method for communicating a status condition signal from each of a plurality of media attachment units (MAUs), comprising the steps of:
asserting, from a status condition consolidator, a MAU status signal to a MAU interface coupled to each of the plurality of MAUs;
reading the status condition signal from each of the plurality of MAUs into a first memory in said MAU interface; thereafter
transmitting the status condition signals from said MAU interface into a second memory in said consolidator via a status data line.

25. The communicating method of claim 24 further comprising the step of transmitting the status condition signals from said consolidator to a management unit.

26. The communicating method of claim 24 further comprising the steps of:
signalling from said MAU interface to said consolidator that said MAU interface is capable of receiving commands for the plurality of MAUs; thereafter
transmitting a control signal for a particular one of the plurality of MAUs to said MAU interface from said consolidator; and thereafter
transmitting said control signal from said MAU interface to said particular one MAU.

27. The communicating method of claim 24 wherein said consolidating unit is a repeater and wherein the status condition signal is a repeater-neutral status condition.

28. An apparatus for communicating MAU status information from a first MAU and a second MAU to a management unit, comprising:
a status condition consolidating apparatus, coupled to the management unit, for storing MAU status information, for asserting a MAU status signal, and for transmitting MAU status information to the management unit; and
a MAU interface, coupled to the first MAU and to the second MAU and to said status condition consolidating apparatus, for accessing MAU status information from each of the MAUs, and for transmitting MAU status information to said status condition consolidating apparatus responsive to said MAU status signal asserted from said consolidating apparatus.

29. The communicating apparatus of claim 28 wherein said status condition consolidating apparatus is part of a repeater coupled to the management unit.

30. A managed repeater, comprising:
a first MAU having a first status condition and responsive to a first MAU command;

a second MAU having a second status condition and responsive to a second MAU command;

a MAU interface, coupled to said first MAU and to said second MAU, for accessing said status conditions, and for responding to a MAU status signal to output said status conditions;

a repeater, coupled to said MAU interface, for asserting said MAU status signal, said repeater receiving said status conditions from said MAU interface via a status data line; and a management unit, coupled to said repeater, for receiving said status conditions from said repeater.

31. The managed repeater of claim 30 wherein said management unit transmits said first MAU command for said first MAU to said repeater, said repeater transmits said first MAU command to said MAU interface, and said MAU interface transmits said first MAU command to said first MAU.

32. The managed repeater of claim 31 wherein said MAU interface signals periodically to said repeater that it accepts said MAU commands.

33. The managed repeater of claim 32 wherein said periodic signal occurs prior to every transmission of status conditions from said MAU interface to said repeater.

34. A managed repeater, comprising:

a first MAU having a first status condition and responsive to a first MAU command;

a second MAU having a second status condition and responsive to a second MAU command;

a third MAU having a third status condition and responsive to a third MAU command;

a fourth MAU having a fourth status condition and responsive to a fourth MAU command;

a MAU interface, coupled to said first MAU and to said second MAU, for accessing said first and second status conditions, and for responding to a first MAU status signal to output said status conditions of said first MAU and said second MAU on a first status data line;

a MAU multiplexer, coupled to said third MAU and to said fourth MAU, for accessing said third and fourth status conditions, and for responding to a second MAU status signal to output one of said third and fourth status conditions via a second status data line, said MAU multiplexer outputting said third status condition when said second MAU status signal has a first value and outputting said fourth status condition when said second MAU status signal has a second value;

a repeater, coupled to said MAU interface and to said MAU multiplexer, for controlling said MAU status signals, said repeater receiving said status conditions from said MAU interface via said status data lines, wherein said repeater receives both said first and said second status conditions when said first MAU status signal has a particular value; and a management unit, coupled to said repeater, for receiving said status conditions from said repeater.

35. The managed repeater of claim 34 wherein said management unit transmits said first MAU command for said first MAU to said repeater, said repeater transmits said first MAU command to said MAU interface, and said MAU interface transmits said first MAU command to said first MAU via said first status data line.

36. The managed repeater of claim 34 wherein said MAU interface signals periodically to said repeater that it accepts said MAU commands from said repeater.

37. The managed repeater of claim 36 wherein said periodic signal occurs prior to every transmission of status conditions from said MAU interface to said repeater.

38. A method for operating a managed repeater, comprising the steps of:

accessing, through a MAU multiplexer, a first status condition of a first MAU coupled to a first port and a second status condition of a second MAU coupled to a second port by asserting a first MAU status signal having a first and a second value to said MAU multiplexer from a repeater, said MAU multiplexer transmitting said first status condition to said repeater via a status data line when said first MAU status signal has said first value and transmitting said second status condition to said repeater via said status data line when said first MAU status signal has said second value; thereafter replacing said MAU multiplexer with a MAU interface, thereafter signalling to said repeater that said MAU interface has replaced said MAU multiplexer; and thereafter accessing, through said MAU interface, said status conditions of said MAUs wherein said MAU interface transmits said status conditions via said status data line to said repeater when said MAU status signal has said first value.

39. The method of claim 38 further comprising the step of:

transmitting, from said repeater after said signalling step, a MAU command signal to one of said MAUs via said status data line when said MAU status signal has a particular value different than said first value.

40. A method for operating a managed repeater, comprising the steps of:

accessing, through a MAU multiplexer, a first status condition of a first MAU coupled to a first port and a second status condition of a second MAU coupled to a second port by asserting a first MAU status signal having a first and a second value to said MAU multiplexer from a repeater, said MAU multiplexer transmitting said first status condition to said repeater via a status data line when said first MAU status signal has said first value and transmitting said second status condition to said repeater via said status data line when said first MAU status signal has said second value; thereafter replacing said MAU multiplexer and said first and second MAU with a transceiver including a MAU interface and a third MAU coupled to said first port and a fourth MAU coupled to said second port, said third MAU having a third status condition and said fourth MAU having a fourth status condition wherein said MAU interface is coupled to said third MAU and to said fourth MAU and to said repeater and is responsive to said MAU status signal; thereafter signalling to said repeater that said MAU interface has replaced said MAU multiplexer; and thereafter accessing, through said MAU interface, said status conditions of said third and fourth MAUs wherein said MAU interface transmits said status conditions of said third and fourth MAUs via said status data line to said repeater when said MAU status signal has said first value.

41. The method of claim 40 further comprising the step of:

transmitting, from said repeater after said signalling step, a MAU command signal to one of said third and fourth MAUs via said status data line when said MAU status signal has a particular value different than said first value.

* * * * *